United States Patent [19]
Dell et al.

[11] Patent Number: 6,092,146
[45] Date of Patent: Jul. 18, 2000

[54] DYNAMICALLY CONFIGURABLE MEMORY ADAPTER USING ELECTRONIC PRESENCE DETECTS

[76] Inventors: Timothy Jay Dell, 9 Parkwood Dr., Colchester, Vt. 05446; Kent Alan Dramstad, 23 Aspen Dr., Essex Junction, Vt. 05452; Marc Raymond Faucher, 44 Winding Brook Dr., S. Burlington, Vt. 05403; Bruce Gerard Hazelzet, 8 Greenfield Ct., Essex Junction, Vt. 05452

[21] Appl. No.: 08/904,187

[22] Filed: Jul. 31, 1997

[51] Int. Cl.[7] .................................................... G06F 13/00
[52] U.S. Cl. .............................. 711/5; 711/115; 711/170; 711/101
[58] Field of Search ................................ 711/5, 115, 170; 395/830, 827, 500; 371/49.3

[56] References Cited

U.S. PATENT DOCUMENTS

| | | | |
|---|---|---|---|
| 5,038,320 | 8/1991 | Heath et al. | 395/830 |
| 5,253,357 | 10/1993 | Allen et al. | 711/115 |
| 5,375,084 | 12/1994 | Begun et al. | 365/63 |
| 5,446,860 | 8/1995 | Dresser et al. | 711/100 |
| 5,446,869 | 8/1995 | Padgett et al. | 395/500 |
| 5,491,804 | 2/1996 | Heath et al. | 395/827 |
| 5,509,138 | 4/1996 | Cash et al. | 711/170 |
| 5,513,135 | 4/1996 | Dell et al. | 365/52 |
| 5,524,232 | 6/1996 | Hajeer | 711/115 |
| 5,541,941 | 7/1996 | Dell et al. | 371/493 |

FOREIGN PATENT DOCUMENTS

| | | | |
|---|---|---|---|
| 0440445 | 6/1996 | European Pat. Off. | G06F 12/00 |
| 9411802 | 5/1994 | WIPO | G06F 3/00 |

OTHER PUBLICATIONS

IBM Technical Disclosure Bulletin—Dynamic Self–Configuration for Memory Cards Arrangements vol. 31, No. 12, May 1989.

Cypress bulletin—CY7C343/CY7C343B (Jan. 1990—Revised Mar. 1997).

Philips Semiconductor Data Sheet PCF8584 $I^2C$–bus controller; Product specification dated 1197 Mar. 19 Supersedes date of Aug. 29, 1995.

*Primary Examiner*—Eddie P. Chan
*Assistant Examiner*—Than Nguyen

[57] ABSTRACT

A dynamically configurable memory adapter is provided for configuring SIMMs in a computer system which employs DIMMs. The adapter includes a plurality of SIMM sockets, a programmable logic device, an EEPROM, a bus controller, and DIP switches. The programmable logic device includes logic for interrogating and configuring serial presence detect data based on a plurality of SIMM characteristics included therein. The serial presence detect data is read by the computer system memory controller during the boot-up process. The dynamically configurable memory adapter also includes direct wiring between the DIMM interface and the SIMMs to thereby allow the SIMMs to directly talk to the memory controller.

25 Claims, 4 Drawing Sheets

DYNAMICALLY CONFIGURABLE MEMORY ADAPTER USING ELECTRONIC PRESENCE DETECTS

FIELD OF THE INVENTION

The invention relates generally to memory adapters for computer systems, and more particularly, to a dynamically configurable memory adapter for adapting SIMMs to the computer systems that employ DIMMs.

BACKGROUND OF THE INVENTION

Computer memory comes in two basic forms: Random Access Memory (hereinafter RAM) and Read-Only Memory (hereinafter ROM). RAM is generally used by a processor for reading and writing data. ROM is generally used for storing data which will never change, such as the Board Input/Output System (hereinafter BIOS).

Generally, RAM makes up the bulk of the computer system's memory, excluding the computer system's harddrive, if one exists. RAM typically comes in the form of dynamic RAM (hereinafter DRAM) which requires frequent recharging or refreshing to preserve its contents. Organizationally, RAM data is typically arranged in bytes of 8 data bits. An optional 9th bit, a parity bit, acts as a check on the correctness of the values of the other eight bits.

A SIMM (Single Inline Memory Module) is a printed circuit board having, among other things, memory chips and connection points or pins. SIMMs are inserted into special sockets on the computer system's motherboard or memory carrier card. A central characteristic of SIMMs is that although there are connection pins on both sides of the SIMM's printed circuit board, these connections are not singular. That is, pin 1 on the front side of the printed circuit board is connected to pin 1 on the backside of the printed circuit board. Therefore, although most SIMMs have a total of 144 pins, only 72 are available for electrical connection.

A DIMM (Dual Inline Memory Module) is also a printed circuit board having, among other things, memory chips and connection points or pins. DIMMs are also inserted into special sockets on the computer system's motherboard or memory carrier card. However, the DIMM includes a dual row of contacts, one on each side of the printed circuit board, which are available for electrical contact. Most general DIMMs include a total of 168 pins, with 84 pins on the front side and 84 pins on the back side of the printed circuit board. Each pin is available for electrical contact.

SIMMs and DIMMs are available in a variety of organizations (e.g., capacity), voltages, speeds, memory types/cycles, physical dimensions, and buffering. Almost all SIMMs and DIMMs have printed circuit boards which are "keyed" and/or "notched" to prevent them from being inserted backwards or into computer systems with different operating voltages from the SIMM or DIMM being inserted. Given the considerable differences between SIMMs and DIMMs, it is apparent these memory modules are not so easily interchanged. While the fundamental architecture of SIMMs and DIMMs is similar, the self-contained descriptive information (e.g., presence detects or PDs) and the physical form factors (e.g., notches, pins, etc.) are dissimilar. As a consequence of these dissimilarities, computer systems which employ DIMMs cannot readily accept SIMMs. Accordingly, it desired to provide a device which overcomes these considerable differences and allows for the use of SIMMs in computer systems that require DIMMs.

SUMMARY OF THE INVENTION

According to one aspect of the present invention, a dynamically configurable memory adapter for adapting a plurality of SIMMs to a computer system configured to employ DIMMs is provided. The adapter includes a plurality of SIMM sockets for accepting the insertion of a plurality of SIMMs; an EEPROM for storing a plurality of serial presence detect data; and a logic device. The logic device includes a plurality of presence detect inputs from each SIMM socket; an Error Correction Code detect input from each SIMM socket; a data width input for indicating the data width of an inserted SIMM; a memory type input for indicating the memory type of an inserted SIMM; a power-on-reset input; a plurality of SIMM characteristic tables; logic for determining the plurality of serial presence detect data from a plurality of SIMM characteristic tables; and logic for programming the EEPROM with the plurality of serial presence detect data. Once the SIMM characteristic data is determined, it is given to the computer system during boot-up in the form of serial presence detect (SPD) data. Thereafter, the computer system may employ the SIMMs even though the computer system is designed to employ DIMMs.

It is therefore an advantage of the present invention to provide a memory adapter that allows the use of SIMMs in computer systems which require DIMMs.

It is a further advantage of this invention to provide a memory adapter that allows for detailed SIMM characteristic data to be provided to a computer system in for the form of serial presence detect data.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to example the principles of this invention.

DETAILED DESCRIPTION OF ILLUSTRATED EMBODIMENT

Figure 1:
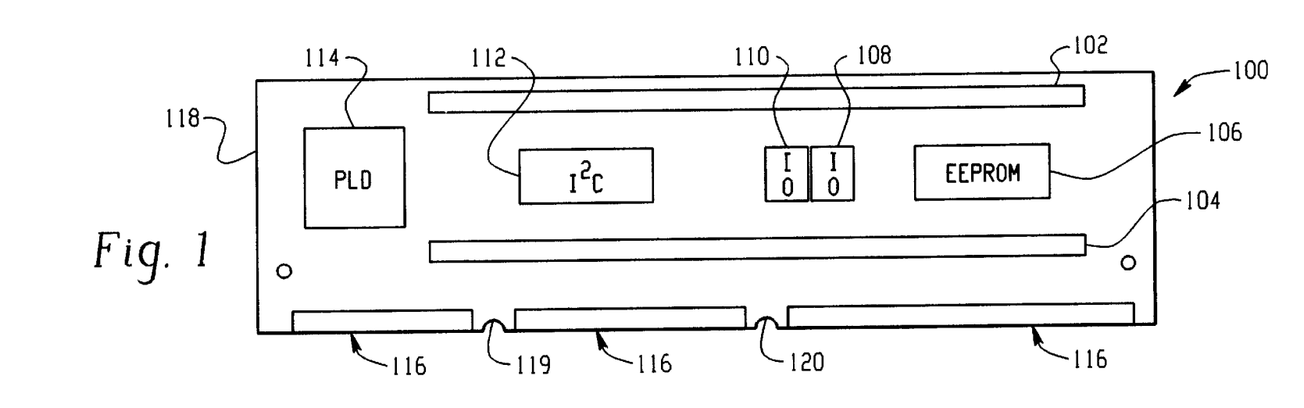
FIGS. 1 and 2 are elevational and perspective views of the dynamic memory adapter of the present invention.

Referring now to FIG. 1, an elevational view of a memory adapter 100 of the present invention is shown. The memory adapter of the present invention allows two 72-pin SIMMs (Single Inline Memory Modules) to be used in a Joint Electronics Design Engineering Council (JEDEC) standard 168-pin unbuffered DRAM socket. The memory adapter 100 includes a circuit board 118 onto which a plurality of devices are attached. The devices attached to circuit board 118 are two 72-pin sockets 102 and 104, a logic device 114, I²C bus controller 112, DIP switches 108 and 110, an EEPROM (Electrically Erasable Programmable Read-Only Memory) 106, and a plurality of pin connectors at 116. The circuit board 118 of the memory adapter 100 further includes a first notch 119 and a second notch 120.

SIMM pin socket 102 is preferably a zero degree 72-pin socket and SIMM pin socket 104 is preferably a 22.5 degree 72-pin socket. The logic device 114 is preferably a CYPRESS CY7C343B PLD (Programmable Logic Device).

The I²C bus controller 114 is preferably a PHILIPS PCF8584 I²C bus controller. The I²C bus is an industry standard serial bus. The EEPROM 106 is preferably a NATIONAL NM24C02L EEPROM. The pin connectors 116 are preferably gold and total 168 pins, with 84 pins on each side of the printed circuit board 118. The first notch 119 is for indicating that the DIMM is unbuffered. The second notch 120 is for indicating that the DIMM is a 5 volt DIMM. The DIP switches 108 and 110 are each 2-position (ON, OFF) switches. While the elements have described with their preferred embodiments, it should be noted that suitable substitutes may exist which can also be employed. For example, the logic device 114 may be a TOSHIBA ASIC TC160G (Application Specific Integrated Circuit).

Figure 2:
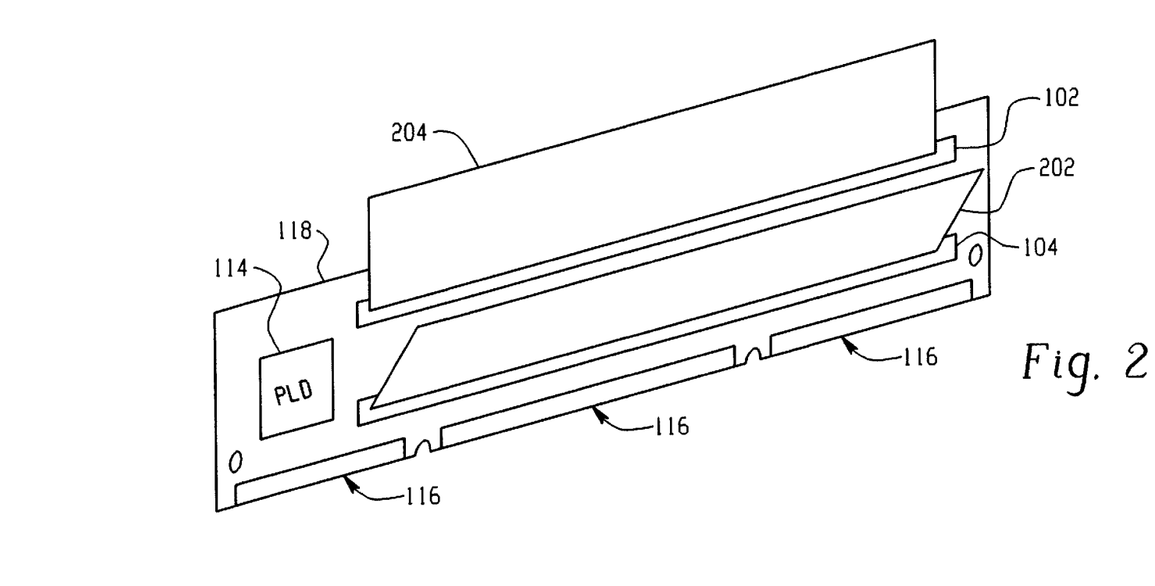

Referring now to FIG. 2, a perspective view of the memory adapter 100 of the present invention is shown with a SIMM (202 and 204) inserted into sockets 102 and 104. FIG. 2 illustrates the inserted SIMM positions with the zero degree socket 102 and the 22.5 degree socket 104. Such a socket configuration provides two advantages. First, it allows for certain components to be mounted on the printed circuit board 118 in between sockets 102 and 104. Second, because DIMM sockets are very closely spaced on a computer motherboard, it provides the memory adapter with the dimensional compatibility of ordinary DIMMs thereby facilitating simple insertion of the memory adapter into a DIMM socket without occupying space reserved for other DIMMs and their sockets.

Figure 3:
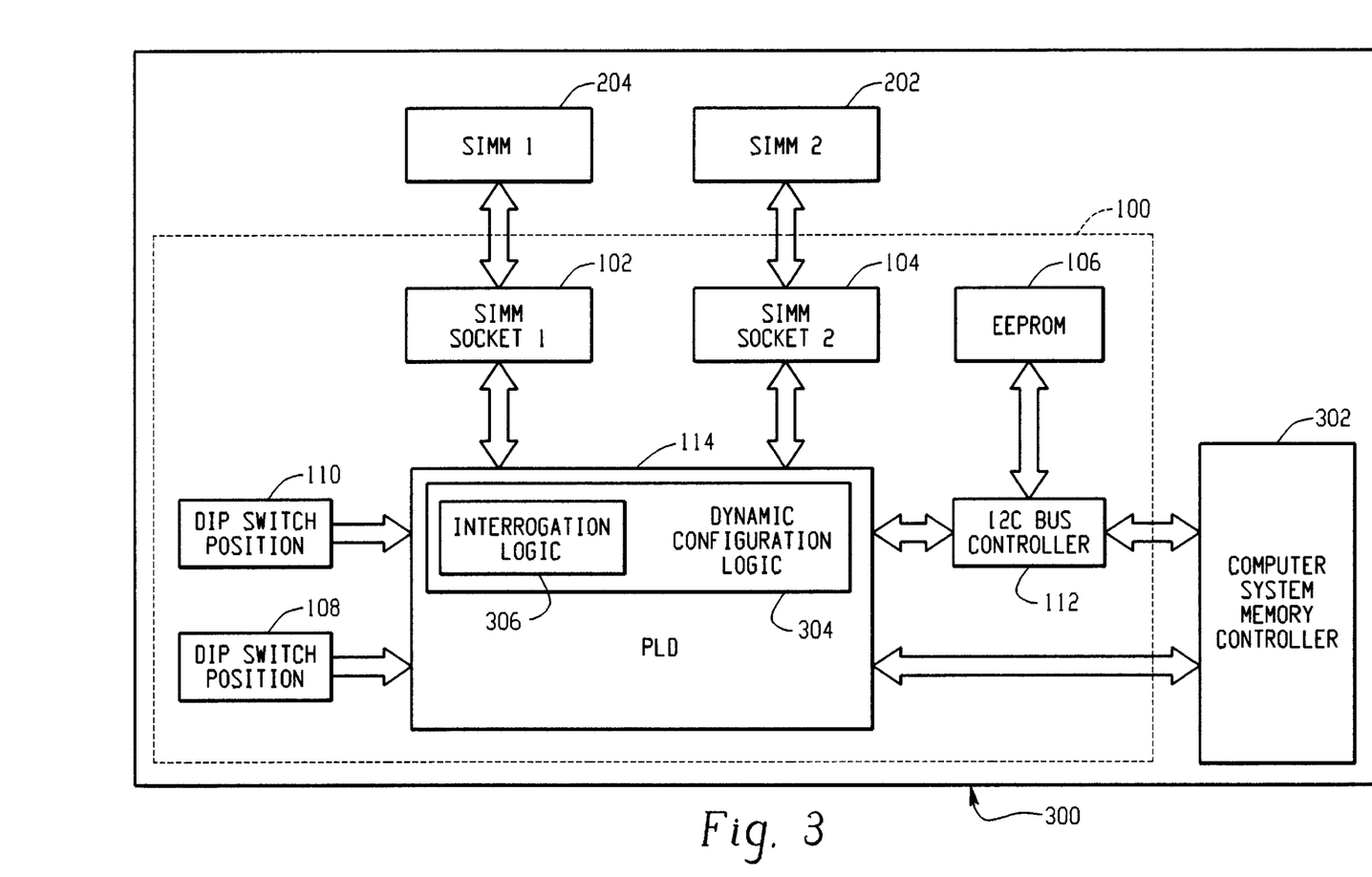
FIG. 3 is a block diagram of the dynamic memory adapter of the present invention and a computer system incorporating the adapter.

Illustrated in FIG. 3 is an overall block diagram of the present invention in a computer system 300. The computer system 300 is preferably a PC compatible computer system such as the IBM APTIVA®, PS/1®, PS/2® or equivalent. The computer system 300 includes, among other things, a CPU and a memory controller 302 which provides the address and data paths and bus controls for memory operations. When installed, the computer system 300 also includes the memory adapter 100. SIMMs 202 and 204 are in electrical communication with the logic device 114 via SIMM sockets 102 and 104. The logic device 114 is also in electrical communication with DIP switches 108 and 110, the I²C bus controller 112, and the system memory controller 302. The I²C bus controller 112 is further in electrical communication with EEPROM 106 and the system memory controller 302. The I²C bus controller 112 serves as an interface between the computer system 300 high-speed memory bus and the memory adapter 100. The logic device 114 includes dynamic configuration logic 304 and interrogation logic 306. As will be described in more detail, the dynamic configuration logic 304 and interrogation logic 306 are responsible for determining the SIMMs' characteristics and proper configuring of the EEPROM.

Figure 4:
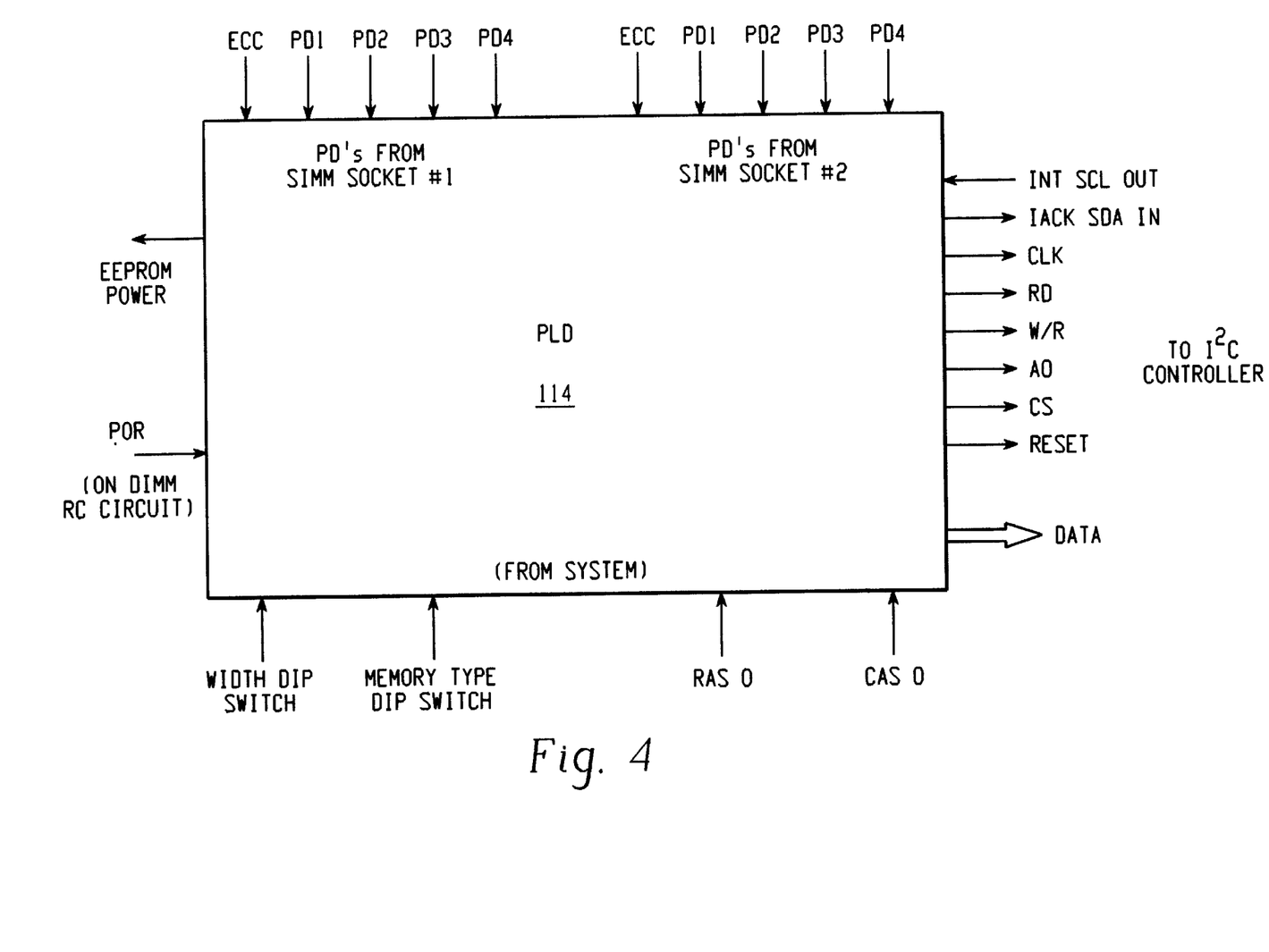
FIG. 4 is diagram illustrating the inputs and outputs of a programmable logic device of the present invention.

Illustrated in FIG. 4 is an input/output diagram of the logic device 114. The logic device 114 includes a plurality of presence detect (PD) inputs from each SIMM (or SIMM socket). In particular, from each SIMM, the ECC, PD1, PD2, PD3, and PD4 signals are input into the logic device 114. A second set of inputs includes the DIP switch signals representing the WIDTH and MEMORY TYPE of the SIMMs are also provided to the logic device 114. A third set of inputs representing the computer system RAS 0 and CAS 0 control lines are further provided to the logic device 114. The logic device 114 further includes a plurality of data outputs indicated by a DATA bus which are in circuit communication with the I²C bus controller 112. The DATA bus is preferably an 8-bit bus. A Power-ON-Reset (POR) input and an EEPROM power output are also provided.

A plurality of control lines also communicate the logic device 114 to the I²C bus controller 112. The control lines include INT SCL OUT, IACK SDA IN, CLK, RD, W/R, AO, CS, and RESET. The INT SCL OUT signal is the serial clock output from the I²C bus controller 112. The IACK SDA IN signal is the serial data signal, the CLK is the clock signal, the RD is the read control signal, the W/R is the write control signal, the AO is the register select signal, the CS is the chip select signal, and RESET is the reset signal which forces the I²C bus controller 112 into a predefined reset state. More information relating to the I²C bus controller 112 of the present invention may be found in the PCF8584 I²C-bus controller, Product Specification, Mar. 19, 1997, Philips Semiconductors.

Figure 5:
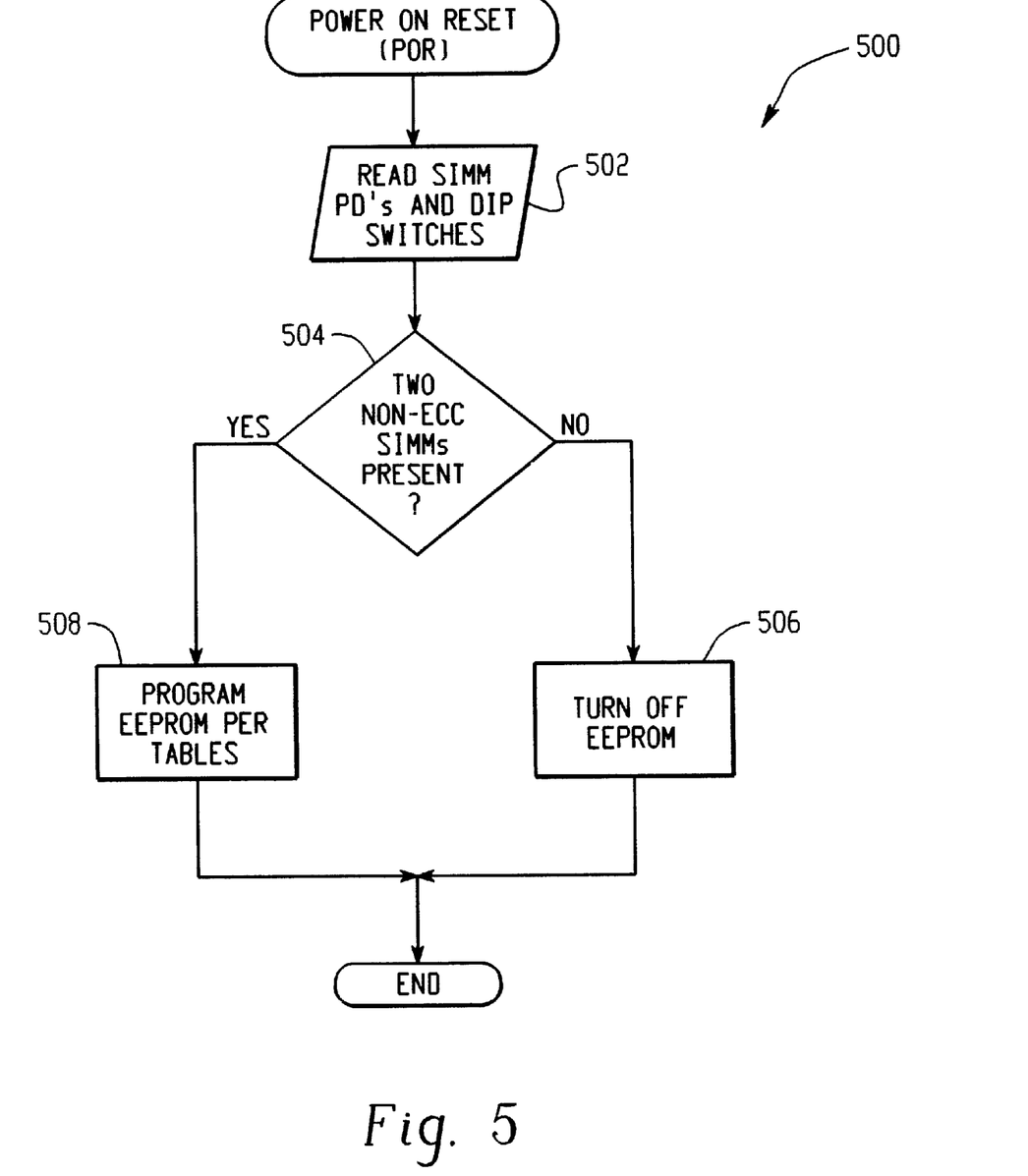
FIG. 5 is a flowchart illustrating the interrogation and dynamic configuration logic of the present invention.

Referring now to FIG. 5, a flowchart of the dynamic configuration logic and interrogation logic is shown. The logic executes upon a Power-On-Reset (POR). A POR typically occurs when the computer system is switched from the off state to the on state (i.e., the computer is turned on). However, previous to the POR, two SIMMs must be inserted into the SIMM sockets of the memory adapter of the present invention. Preferably, the two SIMMs should be matched pairs (e.g., 2 SIMMs, 8 MB, 2M×32, 70 ns, EDO). However, the memory adapter will also work with unmatched pairs.

Once the SIMMs have been selected, the DIP switches are set according to Tables 2.1 and 2.2. Referring now to Tables 2.1 and 2.2, the values of SPD bytes 6, 11, and 2 are shown for the various SIMM configurations based on Parity/Width and Memory Type. Referring now to Table 2.1 in particular, the DIP switch positions for the SIMM organization of Parity/Width (i.e., "x64" and "x72"), along with the values for SPD bytes 6 and 11, are shown. The "x64" and "x72" designations describe width, or the number of bits that can be accessed at the same time (i.e., 64 or 72 bits) on the SIMM.

Referring now specifically to Table 2.2, the DIP switch positions for the SIMM organization of Memory Type (i.e., "FPM" and "EDO"), along with the values for SPD byte 2 is shown. "FPM" refers to a memory configuration known as Fast Page Mode. Fast Page Mode allows the system's memory controller to access a plurality of data bits in terms of a page. The DRAMS which make up the SIMM memory are typically composed of a matrix of rows and columns. The data bits are accessed by addressing a row and a column. In Fast Page Mode, once a memory row (i.e., a page) is addressed, it need not be re-addressed in order to access every data bit in the row (i.e., only the columns need be addressed.) "EDO" refers to a memory type known as Extended Data Out. In Extended Data Out, which is similar to Fast Page Mode in that once a memory row (i.e., a page) is addressed, it need not be re-addressed in order to access every data bit in the row (i.e., only the columns need be addressed.) However, in Extended Data Out mode, a new column access may be performed sooner because the memory controller may begin to access a new column while it is reading data from the current column.

Referring, once again, to FIG. 5, once the SIMMs are inserted and the DIP switches are set, the memory adapter of the present invention is inserted into a computer system which requires unbuffered 168-pin DRAM DIMMs. When the computer system is turned on and a Power-On-Reset POR occurs, the logic 500 reads the SIMM presence detects (PDs) and the DIP switch positions in step 502. After step 502, the logic advances to step 504 where it tests to determine if two non-ECC (Error Correction Code) SIMMs are present. ECC generally involves the generation of a special series of bits which code a data byte. The computer system's motherboard or memory adapter must have additional circuitry for producing and comparing the ECC bits for each data transfer. Accordingly, if two non-ECC SIMMs are NOT present, the logic advances to step 506 where EEPROM 106 is turned off. However, if two non-ECC SIMMs are present, EEPROM 106 is programmed via tables 2.1, 2.2, 3.1, 3.2, 4.1, 4.2, and 4.3 by logic device 114 and the I²C bus controller 112 in step 508. The programming of EEPROMs is conventional and will not be described hereinafter. After step 508, the logic ends and the EEPROM, if programmed, may now be read by the computer system in the standard way that the Serial Presence Detects (SPDs) are read for DIMMs and the computer system may finish booting normally. In this manner, the logic device 114 serves to program the EEPROM 106 with the required SPDs so as to allow the computer system to properly access the SIMMs. The pin layouts of DIMM and SIMM sockets are conventional and connections there between known. The adapter 100 of the present invention includes hardwire connections between the pin configurations of the DIMM socket and the SIMMs.

Referring now to Table 1, the Serial Presence Detect (SPD) data which is programmed into the logic device 114 and subsequently into EEPROM 106 is shown. It should be noted that the values of certain output bytes is factory set and others are determined by the SIMM and DIP switch inputs to logic device 114 shown in FIG. 4. In particular, bytes 0 and 1 are factory set to '80'x (which denotes hexadecimal notation). SPD Byte 2 Memory Type is determined by Table 2.2 and has been discussed previously. SPD bytes 3, 4, and 5, for # Rows, # Columns, and # Banks, respectively are determined from Table 3.1.

Referring now to Table 3.1, the inputs PD1 and PD2 of each SIMM are used to determine the capacity of the SIMMs. The PD1 and PD2 pins of the SIMM are known generally known as capacity pins and indicate the SIMM capacity (See Table 3.2). For the PD1 and PD2 inputs, a "0" indicates ground and a "1" indicates a NO CONNECT (i.e., floating) that is pulled up to $V_{CC}$ via a conventional pull-up resistor. For each possible combination of PD1 and PD2 inputs for both SIMMs, the Row Address (SPD byte 3), Column Address (SPD byte 4), and # Banks (SPD byte 5) are assigned.

Referring again to Table 1, SPD byte 6 is set by Table 2.1. Table 2.1 has been discussed above and will not be discussed hereinafter. SPD bytes 7 and 8, Continuation and Interface level are factory set to '00'x. SPD bytes 9 and 10 which describe $T_{RAC}$ and $T_{CAC}$ (e.g., row and column access times) are determined by Table 4.2.

Referring now to Table 4.2, data for determining the SIMM DRAM speed is shown. This function is facilitated by the use of speed presence detect pins PD3 and PD4 of each SIMM (see Table 4.3). The values for $T_{RAC}$ (SPD byte 9) and $T_{CAC}$ (SPD byte 10) are determined by the slowest SIMM having the slowest $T_{RAC}$. This will ensure that both SIMMs will operate properly since a SIMM can operate at a lower than rated speed but not a faster than rated speed.

Referring once again to Table 1, SPD byte 11 Configuration Types is determined from Table 2.1. As already mentioned, Table 2.1 has been discussed above and will not be presently discussed. SPD byte 12 Refresh Type is factory set to '00'x. Refresh refers to the frequency at which the DRAM is refreshed or recharged. JEDEC approved refresh rates include 4K refresh in 64 ms and 2K refresh in 32 ms. The preferred factory setting indicates a 2K refresh in 32 ms. SPD byte 13 DRAM data width is factory set to '04'x which indicates that the primary DRAM width is 4 bits wide, that is, the DRAM is organized such that it has 4 data input/output (DQs) pins. This is the case for almost all SIMMs. SPD byte 14 Error Checking DRAM Width is factory set to '00'x which indicates that the DIMM does not use or support ECC (error correction code) checkbit DRAMs. SPD bytes 15–255 are not used and are factory set '00'x. Additionally, the adapter may include circuitry for switching between +5 volt SIMMs and +3.3 volt SIMMs. 5 volt and 3.3 volt SIMMs typically include different "keying" arrangements in an attempt to insure that SIMMs are inserted into SIMM sockets having the proper operating voltages. In such a case, the logic device of the present invention would include a set of operating voltage input from the SIMM sockets to indicate SIMM operating voltage. The power supply switching circuitry may then be properly controlled.

Accordingly, once the logic device 114 has read all of its inputs (see FIG. 4), the EEPROM may be programmed, as appropriate, with the SPD data bytes shown in Table 1. The computer system will thus read the SPD data from the EEPROM and complete boot-up. Thereafter, the memory adapter 100 provides direct wiring between the SIMM sockets and the DIMM interface (i.e., system memory controller) on the motherboard.

TABLE 1

Serial Presence Detect (SPD) Data

| Byte | Function | Value |
| --- | --- | --- |
| 0 | # bytes written | Factory set to '80'x |
| 1 | Total # SPD bytes | Factory set to '08'x |
| 2 | Memory Type | See Table 2.2 |
| 3 | # Rows | See Table 3.1 |
| 4 | # Columns | See Table 3.1 |
| 5 | # Banks | See Table 3.1 |
| 6 | Data Width | See Table 2.1 |
| 7 | Continuation | Factory set to '00'x |
| 8 | Interface Level | Factory set to '00'x |
| 9 | $T_{RAC}$ | See Table 4.2 |
| 10 | $T_{CAC}$ | See Table 4.2 |
| 11 | Configuration Type | See Table 2.1 |
| 12 | Refresh Type | Factory set to '00'x |
| 13 | DRAM data width | Factory set to '04'x |
| 14 | Error Checking DRAM width | Factory set to '00'x |
| 15–255 | Not Currently Used | Factory set to '00'x |

TABLE 2.1

DIP SWITCH PROGRAMMING (SPD BYTES 6, and 11)

| Parity/Width | Result | SPD byte 6 | SPD byte 11 |
| --- | --- | --- | --- |
| 0 = Off | x64 | '40'x | '00'x |
| 1 = On | x72 | '48'x | '01'x |

TABLE 2.2

DIP SWITCH PROGRAMMING (SPD BYTE 2)

| Memory Type EDO | Result | SPD byte 2 |
| --- | --- | --- |
| 0 = Off | FPM | '01'x |
| 1 = On | EDO | '02'x |

TABLE 3.1

SPD PROGRAMMING CAPACITY (SPD BYTES 3, 4, and 5)

| SIMM 1 | | SIMM 2 | | SPD BYTE 3 | SPD BYTE 4 | SPD BYTE 5 |
|---|---|---|---|---|---|---|
| PD 1 | PD 2 | PD 1 | PD 2 | Row Addr | Col Addr | # Banks |
| 0 | 0 | 0 | 0 | 10 ('0A'x) | 10 ('0A'x) | 1 ('01'x) |
| 0 | 0 | 0 | 1 | 10 ('0A'x) | 10 ('0A'x) | 1 ('01'x) |
| 0 | 0 | 1 | 0 | 10 ('0A'x) | 10 ('0A'x) | 1 ('01'x) |
| 0 | 0 | 1 | 1 | 10 ('0A'x) | 10 ('0A'x) | 1 ('01'x) |
| 0 | 1 | 0 | 0 | 10 ('0A'x) | 10 ('0A'x) | 1 ('01'x) |
| 0 | 1 | 0 | 1 | 11 ('0B'x) | 11 ('0B'x) | 1 ('01'x) |
| 0 | 1 | 1 | 0 | 11 ('0B'x) | 11 ('0B'x) | 1 ('01'x) |
| 0 | 1 | 1 | 1 | 10 ('0A'x) | 10 ('0A'x) | 1 ('01'x) |
| 1 | 0 | 0 | 0 | 10 ('0A'x) | 10 ('0A'x) | 1 ('01'x) |
| 1 | 0 | 0 | 1 | 11 ('0B'x) | 11 ('0B'x) | 1 ('01'x) |
| 1 | 0 | 1 | 0 | 11 ('0B'x) | 11 ('0B'x) | 2 ('02'x) |
| 1 | 0 | 1 | 1 | 10 ('0A'x) | 10 ('0A'x) | 2 ('02'x) |
| 1 | 1 | 0 | 0 | 10 ('0A'x) | 10 ('0A'x) | 1 ('01'x) |
| 1 | 1 | 0 | 1 | 10 ('0A'x) | 10 ('0A'x) | 1 ('01'x) |
| 1 | 1 | 1 | 0 | 10 ('0A'x) | 10 ('0A'x) | 2 ('02'x) |
| 1 | 1 | 1 | 1 | 10 ('0A'x) | 10 ('0A'x) | 2 ('02'x) |

TABLE 3.2

SIMM PRESENCE DETECTS (Capacity)

| PD 1 | PD 2 | Capacity |
|---|---|---|
| 0 | 0 | 4 MB |
| 0 | 1 | 16 MB |
| 1 | 0 | 32 MB |
| 1 | 1 | 8 MB |

TABLE 4.1

SPD PROGRAMMING ECC

| SIMM 1 ECC | SIMM 2 ECC | RESULT |
|---|---|---|
| 0 | 0 | Block EEPROM |
| 0 | 1 | Block EEPROM |
| 1 | 0 | Block EEPROM |
| 1 | 1 | Enable EEPROM |

TABLE 4.2

SPD PROGRAMMING SPEED (SPD BYTES 9 AND 10)

| SIMM 1 SPEED | | SIMM 2 SP | | SPD Byte 9 | SPD Byte 10 |
|---|---|---|---|---|---|
| PD 3 | PD 4 | PD 3 | PD 4 | $T_{rac}$ (ns) | $T_{cac}$ (ns) |
| 0 | 0 | 0 | 0 | '64' × (100) | '1E' × (30) |
| 0 | 0 | 0 | 1 | '64' × (100) | '1E' × (30) |
| 0 | 0 | 1 | 0 | '64' × (100) | '1E' × (30) |
| 0 | 0 | 1 | 1 | '64' × (100) | '1E' × (30) |
| 0 | 1 | 0 | 0 | '64' × (100) | '1E' × (30) |
| 0 | 1 | 0 | 1 | '46' × (70) | '14' × (20) |
| 0 | 1 | 1 | 0 | '50' × (80) | '19' × (25) |
| 0 | 1 | 1 | 1 | '46' × (70) | '14' × (20) |
| 1 | 0 | 0 | 0 | '64' × (100) | '1E' × (30) |
| 1 | 0 | 0 | 1 | '50' × (80) | '19' × (25) |
| 1 | 0 | 1 | 0 | '50' × (80) | '19' × (25) |
| 1 | 0 | 1 | 1 | '50' × (80) | '19' × (25) |
| 1 | 1 | 0 | 0 | '64' × (100) | '1E' × (30) |
| 1 | 1 | 0 | 1 | '46' × (70) | '14' × (20) |
| 1 | 1 | 1 | 0 | '50' × (80) | '19' × (25) |
| 1 | 1 | 1 | 1 | '3C' × (60) | '0F' × (15) |

TABLE 4.3

PRESENCE DETECT SPEED

| PD 3 | PD 4 | Speed (ns) |
|---|---|---|
| 0 | 0 | 100 |
| 0 | 1 | 70 |
| 1 | 0 | 80 |
| 1 | 1 | 60 |

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. For example, the memory adapter may have more than two SIMM sockets and therefore SIMMs which would be dynamically configured. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A dynamically configurable memory adapter for adapting a plurality of SIMM memory modules to a computer system configured to accept DIMM memory modules, the memory adapter comprising:
    (a) a circuit board having connection pins for insertion into a DIMM socket on a computer system:
    (b) a plurality of sockets on the circuit board for reception of SIMM module connection pins;
    (c) logic on the circuit board electronically connected to said SIMM sockets for determining the characteristics of the plurality of SIMM memory modules including presence detect data;
    (d) EEPROM on the circuit board electronically connected to said logic for storing the characteristics of the plurality of memory modules;
    (e) a bus controller on the circuit board electronically connected to said EEPROM and said circuit board DIMM connection pins to dynamically configure the EEPROM for communicating the memory adapter to the computer system; and
    (f) logic circuitry to prevent presence detect data if at least one SIMM memory module has ECC.

2. The adapter of claim 1 further comprising a logic device having a plurality of memory module characteristic tables.

3. The adapter of claim 2 wherein the logic device further comprises a plurality of inputs and outputs, wherein the inputs comprise a plurality of presence detect signals from the plurality of memory module characteristic data into the EEPROM.

4. The adapter of claim 2 wherein the logic device further comprises logic for programming serial presence detect data from the plurality of memory module characteristic tables.

5. The adapter of claim 3 wherein the logic device further comprises logic for associating the plurality of presence detect signals to the memory module characteristic tables.

6. The adapter of claim 1 further comprising a plurality of DIP switches for indicating the plurality of memory modules characteristic data width and DRAM memory type.

7. A dynamically configurable memory adapter for adapting a plurality of SIMMs to a computer system configured to employ DIMMs, the adapter comprising:

(a) a circuit board having DIMM connection pins for insertion into a DIMM socket on a computer system;

(b) a plurality of SIMM sockets on the circuit board for accepting the insertion of a plurality of SIMMs;

(c) an EEPROM on the circuit board for storing a plurality of serial presence detect data;

(d) a bus controller on the circuit board for interfacing the EEPROM to a logic device on the circuit board;

(e) the logic device comprising:
(1) a plurality of presence detect inputs from each SIMM socket;
(2) an Error Correction Code detect input from each SIMM socket;
(3) a data width input for indicating the data width of an inserted SIMM;
(4) a memory type input for indicating the memory type of an inserted SIMM;
(5) a power-on-reset input;
(6) a plurality of SIMM characteristic tables;
(7) logic for determining the plurality of serial presence detect data from a plurality of SIMM characteristic tables;
(8) logic for programming the EEPROM with the plurality of serial presence detect data; and
(9) logic to prevent presence detect data when an ECC-type SIMM memory module is detected.

8. The adapter of claim 7 wherein the plurality of SIMM characteristic tables includes a memory type table.

9. The adapter of claim 7 wherein the plurality of SIMM characteristic tables includes a data width table.

10. The adapter of claim 7 wherein the plurality of SIMM characteristic tables includes a column and row access time table.

11. The adapter of claim 7 wherein the plurality of SIMM characteristic tables includes a row and column address table.

12. The adapter of claim 7 wherein the plurality of SIMM sockets includes a zero degree SIMM socket and an at least 22.5 degree SIMM socket.

13. A method for dynamically configuring a plurality of SIMMs to a computer system configured to employ DIMMs, the method of comprising the steps of:

(a) providing a plurality of SIMMs;

(b) determining the speed of the plurality of SIMMs;

(c) determining the capacity of the plurality of SIMMs;

(d) determining the architecture of the plurality of SIMMs;

(e) generating a plurality of serial presence detect data from the speed, capacity and architecture of the SIMMs;

(f) storing the plurality of serial presence detect data in a storage device accessible by a memory controller of the computer system through a DIMM receiver; and (g) rendering the storage device inaccessible to the computer system memory controller if at least one of the SIMMs includes Error Correction Code architecture.

14. The method of claim 13 wherein the step of determining the architecture of plurality of SIMMs comprises the steps of accessing a plurality of SIMM characteristic tables stored in a programmable logic device.

15. The method of claim 13 wherein the step of determining the architecture of plurality of SIMMs comprises the steps:

(a) determining the data width of the plurality of SIMMs;

(b) determining the memory type of the plurality of SIMMs;

(c) determining whether the plurality of SIMMs include Error Correction Code; and (d) determining the row and column access time of the plurality of SIMMs.

16. The method of claim 15 wherein the step of determining the row and column access time of the plurality of SIMMs includes the step of determining the slowest row access time of the plurality of SIMMs.

17. The method of claim 13 wherein the storage device is EEPROM and the step of rendering the storage device inaccessible to the computer system memory controller comprises turning off the EEPROM.

18. The method of claim 13 wherein the step of storing the plurality of serial presence detect data in a storage device accessible by a memory controller of the computer system comprises the step of writing the serial presence detect data to an EEPROM accessible by the memory controller of the computer system.

19. The method of claim 13 further comprising the step of sending the plurality of serial presence detect data to the computer system memory controller.

20. A computer for accepting a plurality of types of memory modules comprising:

(a) a CPU;

(b) a system memory controller in circuit communication with the CPU; and (c) a dynamically configurable memory adapter for adapting the plurality of SIMM memory modules to the computer system configured to accept DIMM memory modules, the adapter comprising:
(1) logic for determining the characteristics of the plurality of SIMM memory modules;
(2) EEPROM for storing the characteristics of the plurality of the plurality of types of memory modules;
(3) a bus controller to dynamically configure the EEPROM for communicating the memory adapter to the computer system; and
(4) logic to prevent presence detect data from being communicated to the computer system when an ECC-type SIMM memory module is detected.

21. The adapter of claim 20 further comprising a logic device having a plurality of memory module characteristic tables.

22. The adapter of claim 21 wherein the logic device further comprises a plurality of inputs and outputs, wherein the inputs comprise a plurality of presence detect signals from the plurality of types of memory module characteristic data into the EEPROM.

23. The adapter of claim 22 wherein the logic device further comprises logic for associating the plurality of presence detect signals to the memory module characteristic tables.

24. The adapter of claim 20 further comprising a plurality of DIP switches for indicating the plurality of types of memory modules characteristic data width and DRAM memory type.

25. The adapter of claim 20 wherein the plurality of memory modules include SIMMs.

* * * * *

UNITED STATES PATENT AND TRADEMARK OFFICE
CERTIFICATE OF CORRECTION

PATENT NO. : 6,092,146
DATED : July 18, 2000
INVENTOR(S) : Timothy Jay Dell  Kent Alan Dramstad  Marc Raymond Faucher  Bruce Gerard Hazelzet It is certified that error appears in the above-identified patent and that said Letters Patent is hereby corrected as shown below:

On the title page, please add the following:

[73] Assignee: International Business Machines Corporation
Armonk, N.Y.

*Attorney, Agent, or Firm* — Patrick J. Daugherty, Driggs, Lucas, Brubaker & Hogg Co., L.P.A.

Signed and Sealed this

Twenty-fourth Day of April, 2001

Attest:

NICHOLAS P. GODICI

*Attesting Officer*    *Acting Director of the United States Patent and Trademark Office*